(12) United States Patent
Nickson

(10) Patent No.: US 9,016,481 B2
(45) Date of Patent: Apr. 28, 2015

(54) COMPACTED HYDROCYCLONE APPARATUS IN VESSELS

(71) Applicant: Cameron International Corporation, Houston, TX (US)

(72) Inventor: Peter Nickson, Berkshire (GB)

(73) Assignee: Cameron International Corporation, Houston, TX (US)

( * ) Notice: Subject to any disclaimer, the term of this patent is extended or adjusted under 35 U.S.C. 154(b) by 126 days.

(21) Appl. No.: 13/943,485

(22) Filed: Jul. 16, 2013

(65) Prior Publication Data

US 2013/0299419 A1    Nov. 14, 2013

Related U.S. Application Data

(63) Continuation-in-part of application No. 12/819,859, filed on Jun. 21, 2010, now Pat. No. 8,490,798.

(60) Provisional application No. 61/226,577, filed on Jul. 17, 2009.

(51) Int. Cl.
| | | |
|---|---|---|
| *B04C 5/14* | (2006.01) | |
| *B04C 5/28* | (2006.01) | |
| *B01D 21/26* | (2006.01) | |
| *B01D 21/00* | (2006.01) | |

(52) U.S. Cl.
CPC ... *B04C 5/14* (2013.01); *B04C 5/28* (2013.01); *B01D 21/267* (2013.01); *B01D 21/003* (2013.01); *B01D 2221/04* (2013.01)

(58) Field of Classification Search
CPC .......... B04C 5/14; B04C 5/28; B01D 21/003; B01D 21/267; B01D 2221/04
See application file for complete search history.

(56) References Cited

U.S. PATENT DOCUMENTS

| | | | |
|---|---|---|---|
| 2,765,918 | A | 10/1956 | Fontein et al. |
| 4,019,980 | A | 4/1977 | Beery |
| 4,163,719 | A | 8/1979 | Macierewicz et al. |
| 4,189,377 | A | 2/1980 | Dahlberg et al. |
| 4,437,984 | A | 3/1984 | King et al. |
| 5,337,899 | A | 8/1994 | Andersson et al. |
| 5,499,720 | A | 3/1996 | Bouchillon et al. |
| 5,693,225 | A | 12/1997 | Lee |
| 6,918,494 | B2 | 7/2005 | Girdler |
| 8,490,798 | B2 | 7/2013 | Nickson |
| 2003/0168391 | A1 | 9/2003 | Tveiten |
| 2005/0040119 | A1 | 2/2005 | Kulbeth |
| 2007/0202027 | A1 | 8/2007 | Walker et al. |

FOREIGN PATENT DOCUMENTS

| | | |
|---|---|---|
| WO | 198911339 A1 | 11/1989 |
| WO | 2007096612 A2 | 8/2007 |

*Primary Examiner* — David A Reifsnyder

(74) *Attorney, Agent, or Firm* — Mossman Kumar & Tyler PC

(57) ABSTRACT

A particular stacking configuration may be used for installing or orienting a plurality of hydrocyclones in a vessel in order to reduce vessel size and make process systems more compact at higher flow rates. Vessel size and footprint reduction may be achieved by stacking one or more hydrocyclone packs, cassettes, modules or groups one above the other in a vertically oriented vessel.

19 Claims, 2 Drawing Sheets

COMPACTED HYDROCYCLONE APPARATUS IN VESSELS

CROSS-REFERENCES TO RELATED APPLICATIONS

This application is a continuation-in-part application from U.S. patent application Ser. No. 12/819,859 filed Jun. 21, 2010, which issued as U.S. Pat. No. 8,490,798, which in turn claimed priority from U.S. Provisional Patent Application Ser. No. 61/226,577 filed on 17 Jul. 2009, all of which are incorporated herein by reference.

BACKGROUND OF THE DISCLOSURE

The present disclosure relates to apparatus for improved arrangements or orientations of pluralities of hydrocyclones, and particularly relates, in one non-limiting embodiment, to vessels with orientations of pluralities or groups of hydrocyclones that reduce the total size and footprint of the vessel housing them.

Hydrocyclones are well known. They are devices to classify, separate or sort liquids and/or particles in a liquid mixture based on the densities of the liquids, or in suspension based on the densities of the particles. That is, a hydrocyclone may be used to separate solids from liquids or to separate liquids or fluids of different density. A hydrocyclone will normally have a cylindrical section at the top, where liquid is being fed tangentially, and a conical base. The angle, and hence length of the conical section, plays a role in determining operating characteristics.

A hydrocyclone often has two exits on the axis thereof in opposing directions: the larger on the underflow or accept and a smaller at the overflow or reject, for instance in the case of liquid-liquid deoiling hydrocyclones. For liquid-solid hydrocyclones, the liquid overflow/accept is the relatively larger exit and the solids underflow/reject is the relatively smaller exit. The underflow is generally the denser or thicker fraction, while the overflow is the lighter or more fluid fraction. Another way of understanding a typical hydrocyclone is that it includes an elongated tapered separation chamber of circular cross-section, which decreases in cross-sectional size from a large overflow and input end to an underflow end. An overflow or reject outlet for the lighter fraction is provided at the base of the conical chamber while the heavier underflow or accept fraction of the suspension exits through an axially arranged underflow outlet at the opposite end of the conical chamber. It will be appreciated that the terms "accept" or "reject" are relative and may be reversed depending on the relative density value of the components being separated.

Liquids and suspended particles are introduced into the chamber via one or more tangentially directed inlets. These are adjacent to the overflow end of the separation chamber to create a fluid vortex therein. The centrifugal forces created by this vortex throw denser fluids and particles in suspension outwardly toward the wall of the conical chamber, thus giving a concentration of denser fluids and particles adjacent thereto, while the less dense fluids are brought toward the center of the chamber. As the denser fluids and particles continue to spiral towards the small end of the conical chamber, the lighter fractions are forced to move by differential forces in the reverse direction towards the reject outlet. The lighter fractions are thus carried outwardly through the overflow outlet. The heavier particles continue to spiral along the interior wall of the hydrocyclone and eventually pass outwardly via the underflow outlet. Internally, centrifugal forces are generated by the rapid acceleration of the fluids through the inlet ports of the hydrocyclone. As noted, denser particles or fluids migrate towards the wall for eventual exit via the underflow, whilst the less dense particles and fluids migrate towards the core, remain in the liquid and exit at the overflow through a tube typically extending slightly into the body of the cyclone at the center. Finer particles will not migrate to the center unless they are less dense than the liquid, but they will move outwards more slowly and thus may not have time to escape the center core of liquid.

The fluid velocities within a hydrocyclone are high enough that the dynamic forces produced therein are sufficiently high to overcome the effect of any gravitational forces on the performance of the device. Hydrocyclones may therefore be arranged in various physical orientations without affecting performance. Hydrocyclones are commonly arranged in large banks of several dozen or even several hundred hydrocyclones with suitable intake, overflow, and underflow assemblies arranged for communication with the intake, overflow, and underflow openings respectively of the hydrocyclones.

Earlier separator systems involving large numbers of hydrocyclone separators commonly employed complex systems of intake, overflow, and underflow pipes or conduits which occupied a substantial amount of space and which required costly and complex support structures for the piping systems involved. It is desired to reduce the space occupied by hydrocyclone assemblies and provide a relatively compact arrangement, especially in the petroleum industry, where offshore platform applications and ship-based installations put a premium on space. A compact arrangement would also minimize the cost of the equipment and improve flow distribution to the hydrocyclone inlets.

Difficulties of conventional arrangements or configurations of hydrocyclones include the fact that vessel flow capacity may be limited by the practical handling diameter of the vessel internals. Further, the inlet nozzle size may be limited by the length of the hydrocyclones. Additionally, there is difficulty in sealing in other configurations where there are an increasing number of chambers within the vessel.

There is also loss of efficiency due to poor turndown. Turndown refers to the minimum flow through the vessel that may be achieved whilst still meeting performance. The efficiency of hydrocyclones diminishes as the flow reduces so there comes a point at which the performance will not meet specifications. While it varies from case to case, typically it occurs when the flow is from about 50% to about 75% of the vessel design flow. Flow is related to the number of hydrocyclone liners in service (where the liners are defined herein as the small, individual hydrocyclones). Easily isolatable compartments are desirable to enable improved turndown characteristics.

It would be desirable if an apparatus were devised that could provide a configuration or design of a plurality of hydrocyclones that would permit smaller diameter vessels, which would thus have smaller footprints, e.g. to occupy less area on an offshore platform. Smaller diameter vessels would also dramatically reduce vessel costs in the amount of exotic materials required, e.g. stainless steel, duplex, or super duplex steels.

BRIEF SUMMARY OF THE DISCLOSURE

There is provided, in one non-restrictive form, a hydrocyclone separation assembly that includes a vessel, a first group or plurality of hydrocyclones within the vessel, and one or more additional groups or plurality of hydrocyclones within the vessel. Each of said hydrocyclones involves a tubular body with an inlet section having a first diameter and a separation section having a second diameter, where the first diameter is greater than the second diameter, where each separation section has an underflow nozzle, and where all underflow nozzles of the first group or plurality of hydrocyclones communicates with a first common guide. The subsequent plurality of hydrocyclones is similarly disposed in a generally parallel relation to one another and to the first plurality of hydrocyclones, as would be still further subsequent pluralities of hydrocyclones, if present. Correspondingly, each of said hydrocyclones in the additional groups or pluralities includes a tubular body with an inlet section having a first diameter and a separation section having a second diameter, where the first diameter is greater than the second diameter, where each separation section has an underflow nozzle, and where all underflow nozzles of the second group or plurality of cyclones communicates with a second common guide. The first common guide and the second common guide are in communication. The first common guide may be understood as channeling the more dense material to each additional guide, and then to a sump. In one non-limiting embodiment, the vessel is oriented vertically as are the hydrocyclones in the first and subsequent pluralities or groups.

Another non-limiting embodiment according to the present disclosure may include a hydrocyclone separation assembly comprising: a cylindrical, vertically oriented vessel configured to receive a first cassette and a second cassette; the first cassette within the vessel, the first cassette having a first diameter and comprising: a first plurality of hydrocyclones within the first cassette, each of the hydrocyclones comprising a body with an inlet section having a first diameter and a separation section having a second diameter, where the first diameter is greater than the second diameter, where each separation section has an underflow nozzle, and where each underflow nozzle of the first plurality of hydrocyclones communicates with a first common guide having a central axis; the second cassette within the vessel, the second cassette having a second diameter and comprising: a second plurality of hydrocyclones within the second cassette, each of the hydrocyclones comprising a body with an inlet section having a first diameter and a separation section having a second diameter, where the first diameter is greater than the second diameter, where each separation section has an underflow nozzle, and where each underflow nozzle of the second plurality of hydrocyclones communicates with a second common guide having a central axis, where the first common guide and the second common guide are in communication, where the first cassette is positioned above the second cassette.

Another non-limiting embodiment according to the present disclosure may include a hydrocyclone separation assembly comprising: a cylindrical, vertically oriented vessel configured to receive a first cassette and a second cassette; the first cassette within the vessel, the first cassette having a first diameter and comprising: a first plurality of hydrocyclones within the first cassette, each of the hydrocyclones comprising a body with an inlet section having a first diameter and a separation section having a second diameter, where the first diameter is greater than the second diameter, where each separation section has an underflow nozzle, and where each underflow nozzle of the first plurality of hydrocyclones communicates with a first common guide having a central axis; the second cassette within the vessel, the second cassette having a second diameter and comprising: a second plurality of hydrocyclones within the second cassette, each of the hydrocyclones comprising a body with an inlet section having a first diameter and a separation section having a second diameter, where the first diameter is greater than the second diameter, where each separation section has an underflow nozzle, and where each underflow nozzle of the second plurality of hydrocyclones communicates with a second common guide having a central axis, where the first common guide and the second common guide are in communication, where the first cassette is positioned above the second cassette.

It will be appreciated that the Figures are schematic illustrations that are not necessarily to scale or proportion, and, as such, some of the important parts of the disclosure may be exaggerated for illustration or emphasis.

DETAILED DESCRIPTION OF THE DISCLOSURE

It has been discovered that hydrocyclones may be installed in a vessel in such a way that vessel size and footprint is reduced and the process system is more compact at higher flow rates. This vessel size reduction is accomplished by stacking one or more cyclone cassettes, packs or groups above each other in a vessel. Features of this configuration include the following:

- The ability to pack more cyclones into a smaller diameter vessel, which increases the flow capacity for that vessel.
- Improvement in flow turndown characteristics by increasing the number of vessel chambers that may be isolated or selected.
- The incorporation of multiple chambers allows the use of smaller nozzles.
- More secure, simpler sealing may be provided between the chambers.
- A smaller number of vessels may be permitted for a particular process.

The problems addressed and improved upon by the design described herein include improving the vessel flow capacity previously considered limited by practical mechanical handling diameter of vessel internals. Additionally, sealing between chambers is simplified and improved. Further, in previous designs inlet nozzle size was limited by the length of the cyclones. Also, previous loss of efficiency due to poor turndown is improved.

In the present design, cassettes, groups or modules (also called pluralities) of hydrocyclones (liners) are stacked one above the other in a single vessel. Having more than one stacked chamber or cassette in the vessel means that the number of liners in use, and thus the flow and the turndown, can be reduced by simply isolating one of the chambers. Two stacked chambers or cassettes mean that flow may be reduced to about 25% to about 38% of the design flow. Three stacked chambers or cassettes mean that flow may be reduced to about 16% to about 26% of the design flow if only one chamber is active. It will be appreciated that there may be as many stacked chambers of hydrocyclones as are practical and useful.

There are other, conventional ways of reducing the flow, including taking out individual liners and fitting in blanks, which requires opening up the vessels. Alternatively, a single layer may be divided into separate sections, e.g. like a slice of cake or segments. However, this method is difficult to seal between the chambers and is normally only restricted to two chambers. An advantage of the present method and design described herein is that it is relatively easy to seal between the chambers using O-ring seals. Further, there may be several chambers or cassettes one stacked above the other.

Figure 1:
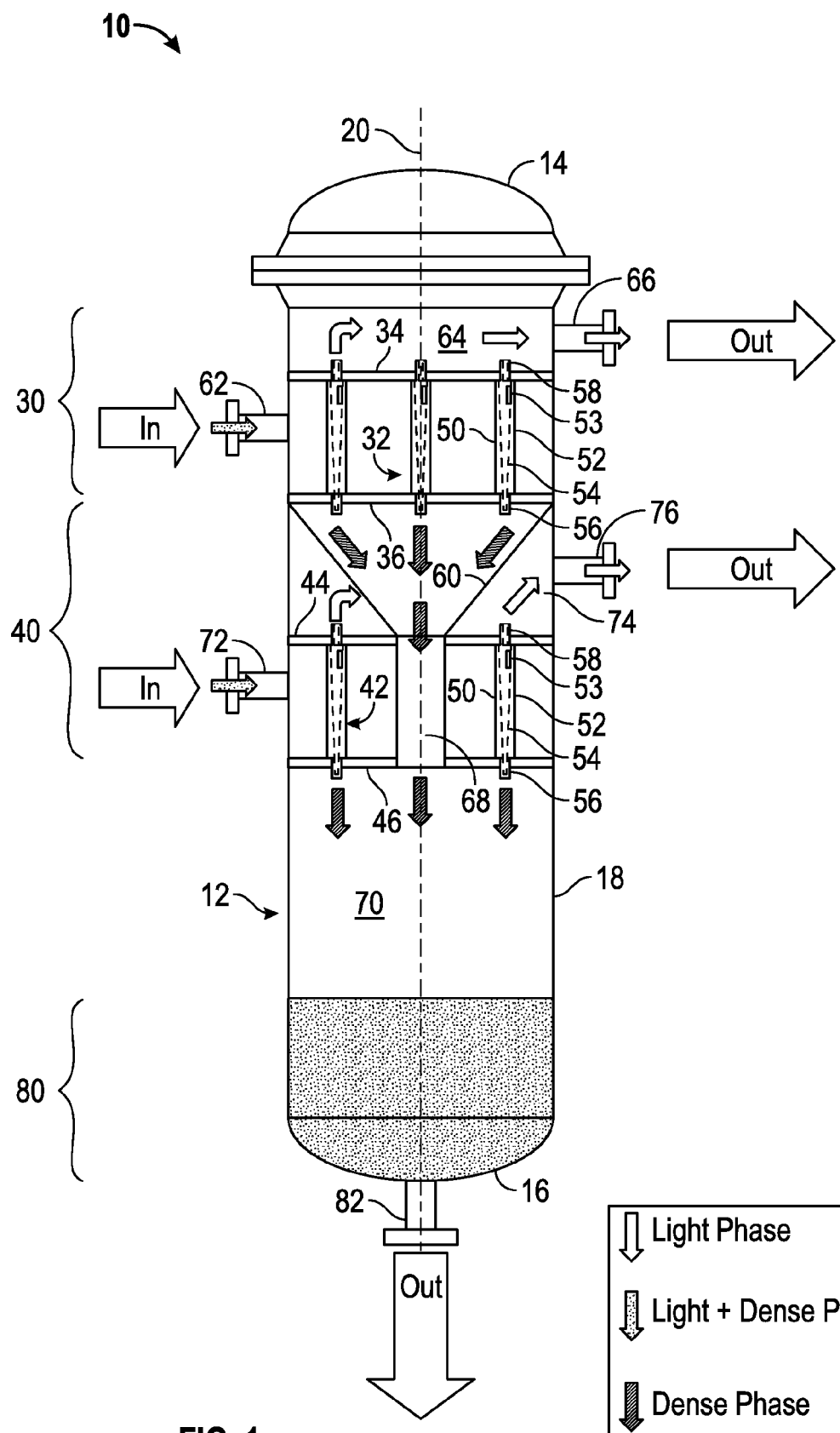
FIG. 1 is a schematic, cross-section illustration of one non-limiting embodiment of a hydrocyclone separation assembly illustrating two or more groups of hydrocyclones positioned one above the other.

Shown in FIG. 1 is a schematic illustration of a hydrocyclone separation assembly 10 having a vessel 12 with a top 14, bottom 16 and side wall 18. While it is not necessary that vessel 12 be of cylindrical shape with a longitudinal axis 20, it is expected that such a shape will be typical since it is conventional to fabricate and handle.

The particular hydrocyclone separation assembly 10 has a first chamber 30 and a second chamber 40, although as previously noted, there may be more chambers present. Chamber 30 has a first plurality of hydrocyclones 32 within chamber 30 and vessel 12, where the hydrocyclones 32 are in parallel relation to one another. It is expected that in most implementations the hydrocyclones 32 will also be in parallel relation to the longitudinal axis 20 of vessel 12, which as shown in FIG. 1, are oriented vertically. While other orientations are certainly possible, it is expected that the vertical orientation shown will be the one most often implemented since it would occupy a minimum footprint on an industrial site, such as an offshore oil platform. In some embodiments, a chamber may be configured to have another chamber stacked above it. The chambers may be sized to have the same diameter or different diameters.

Similarly, chamber 40 has a second plurality of hydrocyclones 42 within chamber 40 and vessel 12, where the hydrocyclones 42 are in parallel relation to one another. Again, it is expected that in most implementations the hydrocyclones 42 will also be in parallel relation to the longitudinal axis 20 of vessel 12, and thus will also be in parallel relation to the first plurality of hydrocyclones 32. In alternative embodiments, one or more of the hydrocyclones 32 and/or hydrocyclones 42 may be nonparallel in relation to the longitudinal axis 20 of vessel 12. In some embodiments, hydrocyclones 32 may be nonparallel to hydrocyclones 42. In some embodiments, the pluralities of hydrocyclones 32, 42 may be grouped into cassettes (shown in FIG. 2) that may be lowered into chambers in the vessel.

Each of the hydrocyclones 32 and 42 include a tubular body 50 with an inlet section 52 having an inlet 53 and a first diameter and a separation section 54 having a second diameter, where each separation section has an underflow nozzle 56. Hydrocyclones 32 and 42 also each include an overflow outlet 58. The hydrocyclones in the first plurality 32 may be the same as or different from the hydrocyclones in the second plurality 42. The first plurality of hydrocyclones 32 is held in place at the upper ends thereof by upper support member 34 and at the lower ends thereof by lower support member 36. The second plurality of hydrocyclones 42 is held in place at the upper ends thereof by upper support member 44 and at the lower ends thereof by lower support member 46. These support members 34, 36, 44 and 46 may be generally flat plates with circular openings to accommodate the corresponding portion of the hydrocyclones 32, 42, where O-rings (not shown) seal between the support member and the hydrocyclone and prevent the passages of the mixtures or phases there between.

A mixture of a relatively lighter phase and a relatively denser phase is injected, pumped or otherwise transmitted under pressure into vessel 12 and first chamber 30 by first chamber inlet 62. As shown in the Figures, the flow of the light phase is shown by white arrows, the flow of the dense phase is shown by the dark arrows (both after separation by the hydrocyclones 32 and 42), where the mixture of the light and dense phases is shown by the gray arrows. After the mixture enters first chamber inlet 62, it is injected into the first plurality of hydrocyclones 32 via inlets 53 and separated in the hydrocyclones 32 by the known process. Each underflow nozzle 56 of hydrocyclones 32 in the upper or first chamber 30 communicates with, empties or exits into a common first solids guide 60, which is shown as a cross-section of a cone in FIG. 1. In the particular embodiment shown in FIG. 1, the first solids guide 60 channels or directs the dense phase or solids through a pipe or passageway 68 through and bypassing (no communication therewith) the center of second chamber 40 and communicates with common second solids guide 70, which may simply have has its side wall as the side wall 18 of vessel 12.

The light phase separated by the first plurality of hydrocyclones 32 exits overflow outlets 58 into common first overflow space 64 which in FIG. 1 is in the upper part of first chamber 30, and the light phase exits vessel 12 via first chamber outlet 66.

Similar to the operation in first chamber 30, another portion of the mixture of a relatively lighter phase and a relatively denser phase is injected, pumped or otherwise transmitted under pressure into vessel 12 and second chamber 40 by second chamber inlet 72. After the mixture enters second chamber inlet 72, it is injected into the second plurality of hydrocyclones 42 via inlets 53 and separated in the hydrocyclones 42 by the known process. Each underflow nozzle 56 of hydrocyclones 42 in the lower or second chamber 40 communicates with, empties, or exits into a common second solids guide 70, which is shown as a cross-section of a cylinder in FIG. 1. The dense phase from both first chamber 30 and second chamber 40 may collect in sump solids collection area 80, which may simply be the lowest portion of vessel 12 in the non-limiting embodiment shown in FIG. 1. Sump 80 may be drained or emptied by solids outlet 82.

In turn, the light phase separated by the second plurality of hydrocyclones 42 exits overflow outlets 58 into common first overflow space 74 which in the FIG. 1 is in the upper part of second chamber 40 and below the conical first solids guide 60, and the light phase exits vessel 12 via second chamber outlet 76.

It will be appreciated that in most versions or embodiments of the hydrocyclone separation assembly 10 that many more hydrocyclones 32 and 42 may be used in the upper or first chamber 30 and lower or second chamber 40, respectively, than are shown in FIG. 1. Only a few hydrocyclones 32 and 42 are illustrated for the sake of simplicity.

As shown in FIG. 1, the first plurality of hydrocyclones 32 and second plurality of hydrocyclones 42 may be in a parallel relation to longitudinal axis 20 of vessel 12. Also, in one non-limiting embodiment, the first solids guide 60 and the second solids guide 70 may have their own central or longitudinal axes, respectively, which are not separately shown in FIG. 1 because they are the same or coaxial with respect to each other and optionally also longitudinal axis 20 of the vessel 12. These central or longitudinal axes of the first solids guide 60 and the second solids guide 70 may also be considered to be in a parallel relation to the longitudinal axis 20 of the vessel 12.

Figure 2:
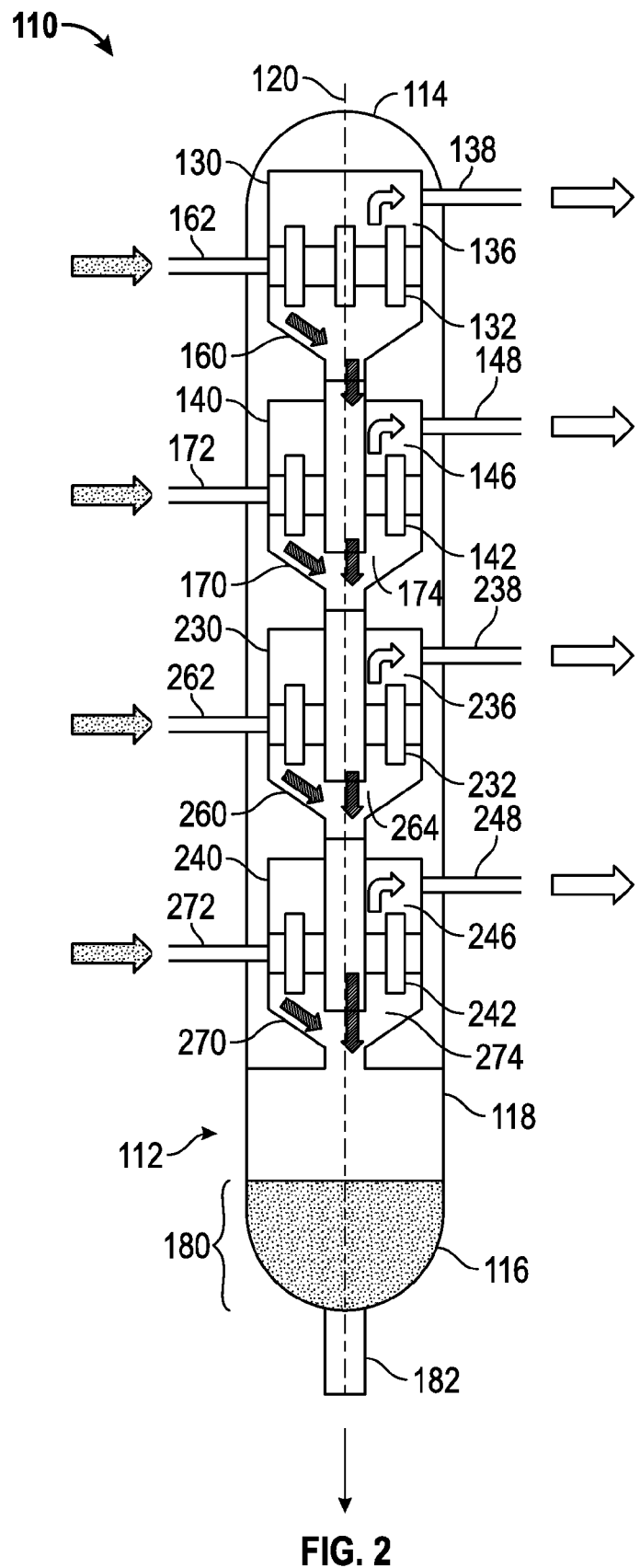
FIG. 2 is a schematic, cross-section illustration of a different non-limiting embodiment of a hydrocyclone separation assembly illustrating four cassettes containing hydrocyclones positioned one above the other.

Shown in FIG. 2 is a schematic illustration of a hydrocyclone separation assembly 110 having a vessel 112 with a top 114, bottom 116 and side wall 118. Again, while it is not necessary that vessel 112 be of cylindrical shape with a longitudinal axis 120, it is expected that such a shape will be typical since it is conventional to fabricate and handle.

The particular hydrocyclone separation assembly 110 has a first cassette 130, a second cassette 140, a third cassette 230 and a fourth cassette 240, although as previously noted, there may be more or less cassettes present. First cassette 130 has a first plurality of hydrocyclones 132 within chamber 130 and vessel 112, where the hydrocyclones 132 are in parallel relation to one another. It is again expected that in most implementations the hydrocyclones 132 will also be in parallel relation to the longitudinal axis 120 of vessel 112, which as shown in FIG. 2, are oriented vertically. While other orientations are certainly possible, it is again expected that the vertical orientation shown will be the one most often implemented since it would occupy a minimum footprint on an industrial site, such as an offshore oil platform. As shown, the cassettes 130, 140, 230 and 240 may be each configured to have the other cassettes stacked above or below it. In one non-limiting embodiment the cassettes 130, 140, 230 and 230 may be modular and lowered into vessel 112 individually in sequence. The chambers may be sized to have the same diameter or different diameters.

Similarly, second cassette 140 has a second plurality of hydrocyclones 142 within cassette 140 and vessel 112, where the hydrocyclones 142 are in parallel relation to one another. Again, it is expected that in most implementations the hydrocyclones 142 will also be in parallel relation to the longitudinal axis 120 of vessel 112, and thus will also be in parallel relation to the first plurality of hydrocyclones 132. Further similarly, third cassette 230 has a third plurality of hydrocyclones 232 within cassette 230, where the hydrocyclones 232 are in parallel relation to one another, and fourth cassette 240 has a fourth plurality of hydrocyclones 242 within cassette 240, where the hydrocyclones 242 are in parallel relation to one another.

In alternative embodiments, one or more of the hydrocyclones 132, 142, 232 and/or hydrocyclones 242 may be non-parallel in relation to the longitudinal axis 120 of vessel 112. In some embodiments, hydrocyclones 132 may be nonparallel to hydrocyclones 142 and/or hydrocyclones 232 and/or hydrocyclones 242.

Each of the hydrocyclones 132, 142, 232 and 242 include a tubular body with an inlet section having an inlet and a first diameter and a separation section having a second diameter, where each separation section has an underflow nozzle as detailed with respect to the hydrocyclones 32 and 42 in FIG. 1. Hydrocyclones 132, 142, 232 and 242 also each include an overflow outlet as also previously described. The hydrocyclones in each cassette may be the same as or different from the hydrocyclones in the other cassettes. The plurality hydrocyclones in each cassette may be held in place at the upper ends thereof by upper support members and at the lower ends thereof by lower support members as previously described with respect to FIG. 1.

Again, as described in FIG. 1, in FIG. 2 a mixture of a relatively lighter phase and a relatively denser phase is injected, pumped or otherwise transmitted under pressure into vessel 112 and cassettes 130, 140, 230 and 240 by chamber inlets 162, 172, 262 and 272, respectively. As shown in the Figures, the flow of the light phase is shown by white arrows, the flow of the dense phase is shown by the dark arrows (both after separation by the hydrocyclones 132, 142, 232 and 242, respectively), where the mixture of the light and dense phases is shown by the gray arrows. After the mixture enters respective chamber inlets 162, 172, 262 and 272, it is injected into the plurality of respective hydrocyclones 132, 142, 232 and 242 via their respective inlets and separated in the hydrocyclones 132, 142, 232 and 242 by the known process. Each respective underflow nozzle of hydrocyclones 132, 142, 232 and 242 in the respective cassettes 130, 140, 230 and 240 communicates with, empties or exits into a common respective solids guide 160, 170, 260 and 270, which are shown as cross-sections of cones in each occurrence FIG. 2, although it will be appreciated that other forms would also be suitable, including but not limited to cylinders, pipes and other conduits. In the particular embodiment shown in FIG. 2, the first solids guide 160 channels or directs the dense phase or solids through a pipe or passageway 168 through and bypassing (no communication therewith) the center of second chamber 140 and communicates with common second solids guide 170 via gap 174. Similarly, second solids guide 170 communicates with third solids guide 260 via gap 264, and third solids guide 260 communicates with fourth solids guide 270 via gap 274. It will be appreciated that the noted communications may be made using a different structure than gaps 174, 264 and 274, such as pipes or conduits or other suitable structures.

The light phase separated by the respective pluralities of hydrocyclones 132, 142, 232, and 242 exits respective overflow outlets into common first, second, third and fourth overflow spaces 136, 146, 236, and 246, respectively which in FIG. 2 is in the respective upper parts of first cassette 130, second cassette 140, third cassette 230 and fourth cassette 240, respectively, and the light phase exits vessel 112 via first cassette outlet 138, second cassette outlet 148, third cassette outlet 238 and fourth cassette outlet 248, respectively.

The dense phase from first cassette 130, second cassette 140, third cassette 230 and fourth cassette 240 may collect in sump solids collection area 180, which may simply be the lowest portion of vessel 112 in the non-limiting embodiment shown in FIG. 2. Sump 180 may be drained or emptied by solids outlet 182.

It will be appreciated that in most versions or embodiments of the hydrocyclone separation assembly 110 that many more hydrocyclones 132 and 142, 232 and 242 may be used in the first cassette 130, second cassette 140, third cassette 230 and fourth cassette 240, respectively, than are shown in FIG. 2. Only a few hydrocyclones are illustrated for the sake of simplicity.

As shown in FIG. 2, the first plurality of hydrocyclones 132, second plurality of hydrocyclones 142, third plurality of hydrocyclones 232 and fourth plurality of hydrocyclones 242 may be in a parallel relation to longitudinal axis 120 of vessel 112. Also, in one non-limiting embodiment, the first solids guide 160, the second solids guide 170, the third solids guide 260 and fourth solids guide 270 may have their own central or longitudinal axes, respectively, which are not separately shown in FIG. 2 because they are the same or coaxial with respect to each other and optionally also longitudinal axis 120 of the vessel 112. These central or longitudinal axes of the first solids guide 160, the second solids guide 170, third solids guide 260 and fourth solids guide 270 may also be considered to be in a parallel relation to the longitudinal axis 120 of the vessel 112.

It will be appreciated that the design and configuration of the hydrocyclones 132, 142, 232 and 242 in first, second, third and fourth cassettes 130, 140, 230 and 240, respectively, and the optional inclusion of more cassettes containing more hydrocyclones, easily permits various of the hydrocyclones in their respective cassettes to be engaged or disengaged by the use of conventional valves (not shown) on the inlets 162, 172, 262 and 272 respectively, and/or the respective outlets 138, 148, 238 and 248.

For instance, for oilfield use, during the production life of an oil field, the amount of water produced with the oil increases with time. Thus, as the flow begins relative lower and increases over the years, the design and configuration described and illustrated makes it easier to match the number of hydrocyclones to the flow.

Having separate cassettes (e.g. 30 and 40, or 130, 140, 230 and 240) that may be isolated improves the flow turndown. The individual hydrocyclones (e.g. 32 and 42, or 132, 142, 232 and 242) are a fixed length and are mounted between the two plates in a vessel so that the nozzle diameter may be smaller than the length of the hydrocyclone. The size of the nozzle that fits therefore limits the number of hydrocyclone that may be put into a single layer or cassette in the vessel. A vessel stacked with cassettes, groups or pluralities of cyclones, such as that described and shown, may contain more hydrocyclones and handle more flow.

The hydrocyclone liner section of the vessel may be similar or smaller in volume to those conventionally used for the same flow volume. Vessel size is often more related to the amount of solids collected in the sump (e.g. 80 or 180) under the hydrocyclones, and the time the operator requires between emptying the sump. Thus, it is expected that in most cases, the individual vessel will be a smaller diameter than conventional vessels that may handle the same flow rate, and thus provide a smaller footprint, but taller than such conventional vessels. Stacking the liners in cassettes or chambers one above the other results in using less total number of vessels to handle the flow which may change over time. If the vessels are made from corrosion resistant materials such as stainless steel, duplex steel or super duplex steel (or other exotic steels), there can be a significant cost savings by using a vessel with an overall smaller diameter because of the full vessel diameter flanges or quick release closures and other components.

In practice, in one non-limiting embodiment during the construction of the hydrocyclone separation assembly, each group or cassette of hydrocyclones will be assembled outside of the vessel and dropped in as a cartridge or cassette assembly. Each cartridge or cassette assembly will have to seal against a ring welded to the wall of the vessel; therefore the outside diameter of each cartridge or cassette assembly will decrease from top to bottom in the vessel so they pass through the welded in seal rings for the ones above. This is not likely to be a large change in diameter, perhaps ¼" to ½" (0.6 to 1.3 cm) difference for each layer or cassette.

It may thus be readily seen that the design and configuration of liners in a vessel as described and illustrated herein may increase flow capacity, increase flow turndown and decrease equipment size, as well as improve the ability to adapt or change the number of liners on line in one or more vessel, as compared with conventional designs or configurations. The design and configuration herein will also save space and weight, which will be applicable for future applications of cyclones.

In the foregoing specification, the disclosure has been described with reference to specific embodiments thereof, and is expected to be effective in providing methods and apparatus that pack more hydrocyclones into a smaller diameter vessel to increase the flow capacity of that vessel. However, it will be evident that various modifications and changes may be made thereto without departing from the broader spirit or scope of the disclosure as set forth in the appended claims. Accordingly, the specification is to be regarded in an illustrative rather than a restrictive sense. For example, the hydrocyclones, solids guides, cassettes, vessel shape and other component parameters may be changed or optimized from that illustrated and described, and even though certain additional features are not specifically identified or tried in a particular system, method or apparatus described herein, they would be anticipated to be within the scope of this disclosure. For instance, the materials, surfaces, coatings and treatments any of the described components and equipment would be expected to find utility and be encompassed by the appended claims. The configuration and method described and illustrated herein is expected to be useful regardless of liner type (e.g. K, G, etc.).

The words "comprising" and "comprises" as used throughout the claims is to interpreted "including but not limited to".

The present disclosure may suitably comprise, consist or consist essentially of the elements disclosed and may be practiced in the absence of an element not disclosed. For instance, in one non-limiting embodiment, the hydrocyclone separation assembly comprises a cylindrical, vertically oriented vessel configured to receive at least one first cassette and at least one second cassette. The first cassette within the vessel has a first diameter and consists essentially of or alternatively consists of a first plurality of hydrocyclones within the first cassette, each of the hydrocyclones comprising a body with an inlet section having a first diameter and a separation section having a second diameter, where the first diameter is greater than the second diameter, where each separation section has an underflow nozzle, and where each underflow nozzle of the first plurality of hydrocyclones communicates with a first common guide having a central axis. The second cassette within the vessel has a second diameter and consists essentially of or alternatively consists of a second plurality of hydrocyclones within the second cassette, each of the hydrocyclones comprising a body with an inlet section having a first diameter and a separation section having a second diameter, where the first diameter is greater than the second diameter, where each separation section has an underflow nozzle, and where each underflow nozzle of the second plurality of hydrocyclones communicates with a second common guide having a central axis, where the first common guide and the second common guide are in communication. Further the first cassette is positioned above the second cassette.

What is claimed is:
1. A hydrocyclone separation assembly comprising:
  a cylindrical, vertically oriented vessel configured to receive a first cassette and a second cassette;
  the first cassette within the vessel, the first cassette having a first diameter and comprising:
    a first plurality of hydrocyclones within the first cassette, each of the hydrocyclones comprising a body with an inlet section having a first diameter and a separation section having a second diameter,
      where the first diameter is greater than the second diameter,
      where each separation section has an underflow nozzle, and
      where each underflow nozzle of the first plurality of hydrocyclones communicates with a first common guide having a central axis;
  the second cassette within the vessel, the second cassette having a second diameter and comprising:
    a second plurality of hydrocyclones within the second cassette, each of the hydrocyclones comprising a body with an inlet section having a first diameter and a separation section having a second diameter,
      where the first diameter is greater than the second diameter,
      where each separation section has an underflow nozzle, and where each underflow nozzle of the second plurality of hydrocyclones communicates with a second common guide having a central axis, where the first common guide and the second common guide are in communication, where the first cassette is positioned above the second cassette.

2. The hydrocyclone separation assembly of claim 1, where the first diameter of the first cassette and the second diameter of the second cassette are different.

3. The hydrocyclone separation assembly of claim 1, where the first diameter of the first cassette and the second diameter of the second cassette are the same.

4. The hydrocyclone separation assembly of claim 1, where each of the first plurality of hydrocyclones is generally parallel to the other hydrocyclones of the first plurality of hydrocyclones; and each of the second plurality of hydrocyclones is generally parallel to the other hydrocyclones of the second plurality of hydrocyclones.

5. The hydrocyclone separation assembly of claim 4, where the hydrocyclones of the first plurality of hydrocyclones are generally parallel with the hydrocyclones of the second plurality of hydrocyclones.

6. The hydrocyclone separation assembly of claim 5 where the first common guide and the second common guide each have a central axis and are coaxial with respect to each other.

7. The hydrocyclone separation assembly of claim 1 where the central axes of the first and second common guides are in a parallel relation to the longitudinal axis of the vessel.

8. The hydrocyclone separation assembly of claim 7 where the vessel and the first and second common guides are coaxial.

9. The hydrocyclone separation assembly of claim 1 where the first diameter of the first plurality of hydrocyclones is the same as the first diameter of the second plurality of hydrocyclones, and where the second diameter of the first plurality of hydrocyclones is the same as the second diameter of the second plurality of hydrocyclones.

10. A hydrocyclone separation assembly comprising:
a cylindrical, vertically oriented vessel configured to receive a first cassette and a second cassette;
a first cassette within the vessel, the first cassette having a first diameter and comprising:
a first plurality of hydrocyclones within the first cassette, each of the hydrocyclones comprising a body with an inlet section having a first diameter and a separation section having a second diameter,
where the first diameter is greater than the second diameter,
where each separation section has an underflow nozzle, and
where each underflow nozzle of the first plurality of hydrocyclones communicates with a first common guide having a central axis;
a second cassette within the vessel, the second cassette having a second diameter and comprising:
a second plurality of hydrocyclones within the second cassette, each of the hydrocyclones comprising a body with an inlet section having a first diameter and a separation section having a second diameter,
where the first diameter is greater than the second diameter,
where each separation section has an underflow nozzle, and
where each underflow nozzle of the second plurality of hydrocyclones communicates with a second common guide having a central axis, where the first common guide and the second common guide are in communication, where the first cassette is positioned above the second cassette.

11. The hydrocyclone separation assembly of claim 10 where the first common guide and the second common guide each have a central axis in parallel relation to the longitudinal axis of the vessel and are coaxial with respect to one another and the vessel.

12. The hydrocyclone separation assembly of claim 10, where the first diameter of the first cassette and the second diameter of the second cassette are different.

13. The hydrocyclone separation assembly of claim 10, where the first diameter of the first cassette and the second diameter of the second cassette are the same.

14. The hydrocyclone separation assembly of claim 10, where each of the first plurality of hydrocyclones is generally parallel to the other hydrocyclones of the first plurality of hydrocyclones; and each of the second plurality of hydrocyclones is generally parallel to the other hydrocyclones of the second plurality of hydrocyclones.

15. The hydrocyclone separation assembly of claim 10 where the first diameter of the first plurality of hydrocyclones is the same as the first diameter of the second plurality of hydrocyclones, and where the second diameter of the first plurality of hydrocyclones is the same as the second diameter of the second plurality of hydrocyclones.

16. A hydrocyclone separation assembly comprising:
a cylindrical, vertically oriented vessel configured to receive a first cassette and a second cassette;
a first cassette within the vessel, the first cassette having a first diameter and comprising:
a first plurality of hydrocyclones within the first cassette, each of the hydrocyclones comprising a body with an inlet section having a first diameter and a separation section having a second diameter,
where the first diameter is greater than the second diameter,
where each separation section has an underflow nozzle, and
where each underflow nozzle of the first plurality of hydrocyclones communicates with a first common guide having a central axis;
a second cassette within the vessel, the second cassette having a second diameter and comprising:
a second plurality of hydrocyclones within the second cassette, each of the hydrocyclones comprising a body with an inlet section having a first diameter and a separation section having a second diameter,
where the first diameter is greater than the second diameter,
where each separation section has an underflow nozzle, and
where each underflow nozzle of the second plurality of hydrocyclones communicates with a second common guide having a central guide, where the first common guide and the second common guide are in communication,
where the first diameter of the first cassette and the second diameter of the second cassette are the same, where the first cassette is positioned above the second cassette, where the first common guide and the second common guide each have a central axis in parallel relation to the longitudinal axis of the vessel.

17. The hydrocyclone separation assembly of claim 16 where the first common guide and the second common guide are coaxial with respect to one another and the vessel.

18. The hydrocyclone separation assembly of claim 16, where each of the first plurality of hydrocyclones is generally parallel to the other hydrocyclones of the first plurality of hydrocyclones; and each of the second plurality of hydrocyclones is generally parallel to the other hydrocyclones of the second plurality of hydrocyclones.

19. The hydrocyclone separation assembly of claim 16 where the first diameter of the first plurality of hydrocyclones is the same as the first diameter of the second plurality of hydrocyclones, and where the second diameter of the first plurality of hydrocyclones is the same as the second diameter of the second plurality of hydrocyclones.

* * * * *